United States Patent [19]
Wolter

[11] 3,782,145
[45] Jan. 1, 1974

[54] STEERING-LOCK, PARTICULARLY FOR AUTOMOTIVE VEHICLES

[75] Inventor: Heinz Wolter, Cologne-Lindenthal, Germany

[73] Assignee: Firma Josef Voss KG., Bruhl Bez., Cologne, Germany

[22] Filed: Sept. 23, 1971

[21] Appl. No.: 183,073

[30] Foreign Application Priority Data
Sept. 24, 1970 Germany............ P 20 47 054.6

[52] U.S. Cl.................. 70/186, 70/252, 70/370
[51] Int. Cl............................................. B60r 25/02
[58] Field of Search................ 70/186, 252, 370

[56] References Cited
UNITED STATES PATENTS

| | | | |
|---|---|---|---|
| 378,267 | 2/1888 | Taylor | 70/370 |
| 1,777,725 | 10/1930 | Hines | 70/370 |
| 3,566,635 | 3/1971 | Wolter | 70/252 |
| 3,613,412 | 10/1971 | Yamaguchi | 70/252 |

FOREIGN PATENTS OR APPLICATIONS

| | | | |
|---|---|---|---|
| 1,800,885 | 4/1970 | Germany | 70/252 |

*Primary Examiner*—Albert G. Craig, Jr.
*Attorney*—Ernest G. Montague

[57] ABSTRACT

A steering lock equipped with a lock cylinder, in particular for automotive vehicles, which comprises a steering column including a lock housing and a bolt for locking the steering column upon entering its locking position. A spring causes the bolt to enter the locking position. A locking member is mounted in the lock housing and engages resiliently the bolt in the opening position of the latter, for securing the bolt against unintentional locking of the steering column. A lock cylinder is disposed in the lock housing. An intermediate member is disposed in the lock cylinder and has an end portion. A lock key operates tumblers. The locking member is controlled by the lock key by means of the intermediate member, whereby the transfer of the locking member into the bolt releasing position is possible after at least nearly complete removal of the key. A cylinder core is mounted in the lock cylinder to receive the key and rotatable into corresponding locking positions by means of the key. The closing cylinder has a projection capable of being pressed back into the releasing position only with the angularly displaced cylinder core, and a run-up inclination for the end portion is coordinated to the intermediate member.

3 Claims, 10 Drawing Figures

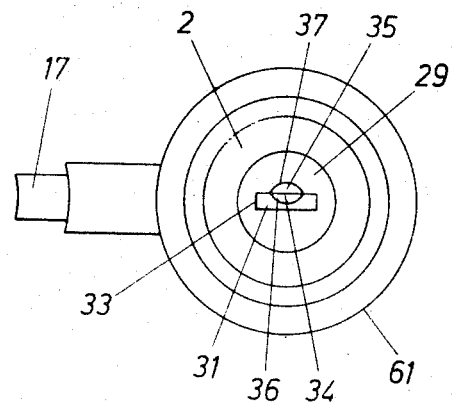
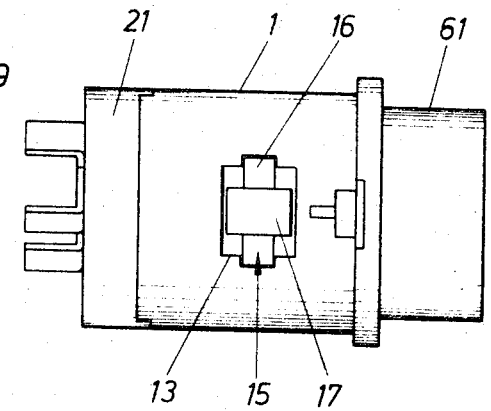
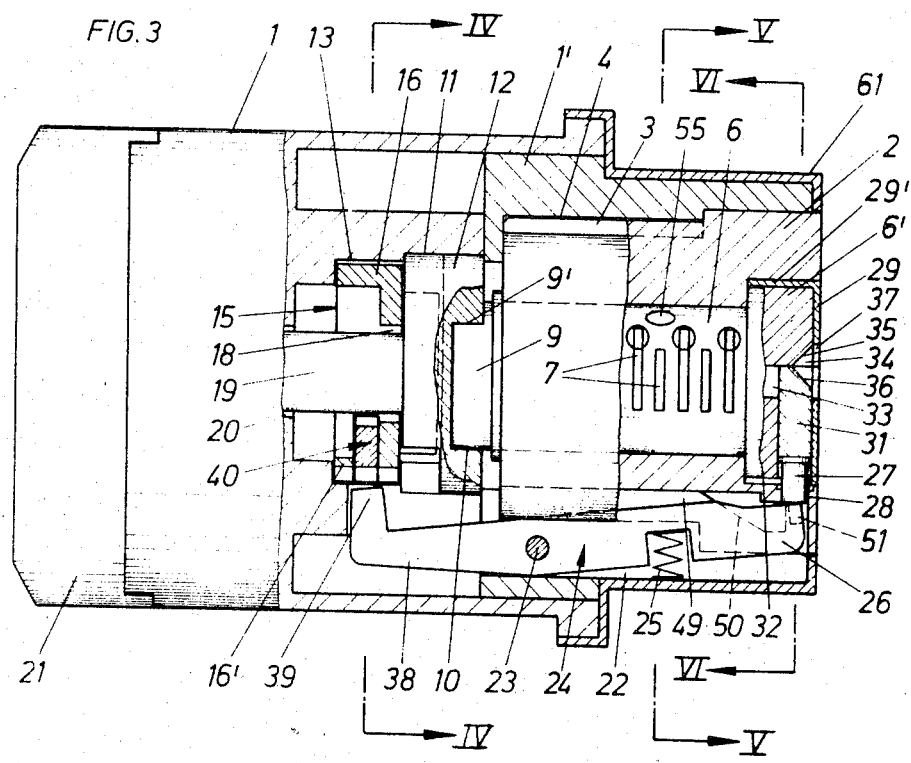

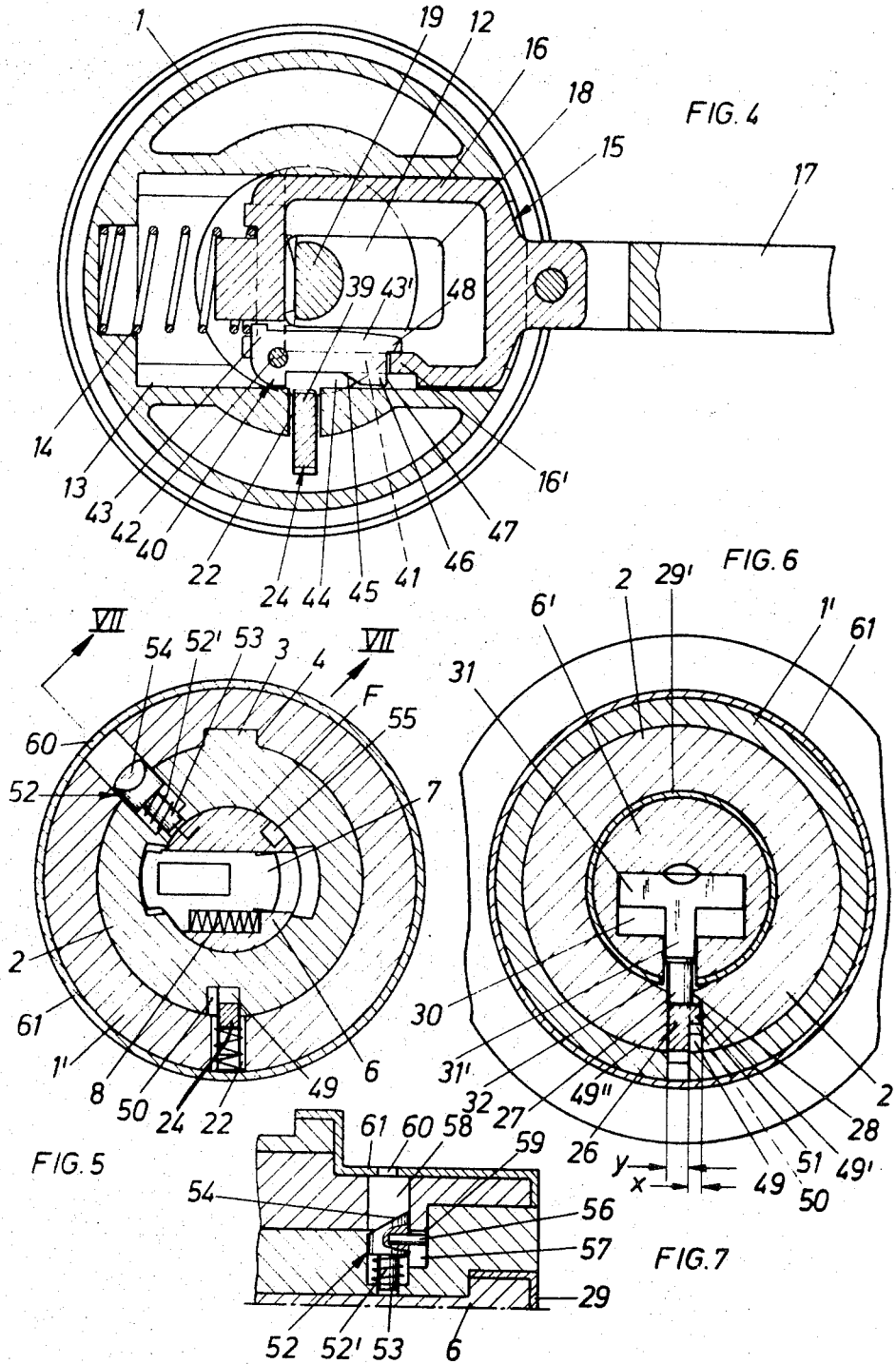

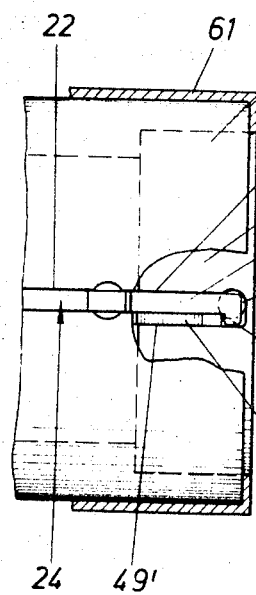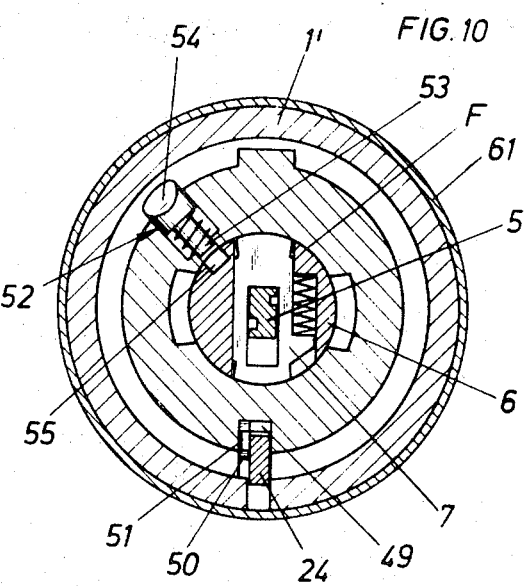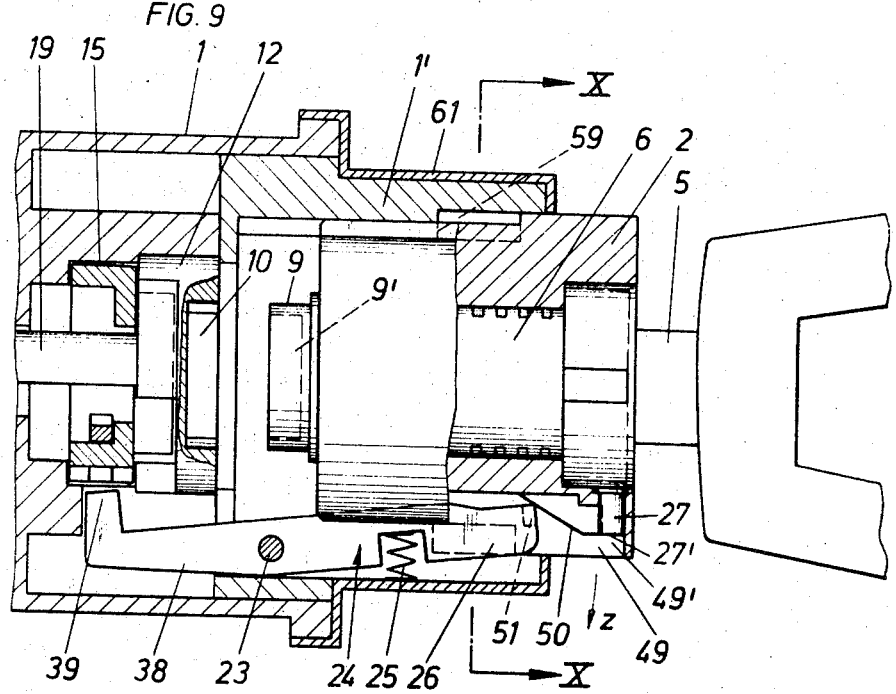

STEERING-LOCK, PARTICULARLY FOR AUTOMOTIVE VEHICLES

The present invention relates to a steering lock particularly for automotive vehicles, in general, and to such steering lock equipped with a lock cylinder, in particular, in which a steering shaft is locked by means of a bolt entering into the locking position by means of a spring force and in which the bolt is secured against unintentionable blocking of the steering by a locking member mounted in the lock housing and resiliently interengaging with its end in the unlocked position of the bolt. The locking member is controlled by means of a key operating the tumblers via an intermediate member arranged in the lock cylinder, such that the transfer of the locking member into the position releasing the bolt is possible only after complete or nearly complete removal, respectively, of the key.

In connection with a known embodiment to be considered, the intermediate member is designed as a disk disposed behind a head plate of the lock cylinder and arranged in the longitudinal axis of its plane, which disk projects in the "position" of the steering lock with removed key into the key channel and upon insertion of the key is moved radially outwardly over its key back. This disk engages the end pointing thereto of a locking member mounted in the lock cylinder, which locking member secures the withdrawn bolt against unintentional locking of the steering. The steering lock is mounted in this arrangement as complete structural part in the vehicle. This embodiment permits, however, for mounting reasons no joint engagement and insertion of the lock cylinder of the steering locks in an adjustment to those of the door grips, trunk locks etc.

It is one object of the present invention to provide a steering lock particularly for automotive vehicles, wherein the steering lock is designed such, that the lock cylinder of the steering lock can be brought together in adjustment to that of the door grip, the trunk lock, etc. and for obtaining an economical production, is insertable extremely easily and in a short time, into the steering lock housing.

It is another object of the present invention to provide a steering lock particularly for automotive vehicles, wherein the lock cylinder to be inserted in the steering lock housing has a rest projection capable of being compressed backwardly into a releasing position, only in an angularly displaced cylinder core and an oblique engagement is coordinated in the intermediate member for the end of the locking member.

In accordance with the present invention, it is of advantage, that the oblique engagement sits on the one side wall of a longitudinally extending locking member-entrance channel of the lock cylinder, and extends only over a part of the width of the channel and the locking member has at is end pointing towards the intermediate member a projection extending towards the intermediate member.

An advantageous design resides, in accordance with the present invention, in the fact, that the inside end of a rest projection equipped with a latch head is disposed in front of the jacket face of the cylinder core, which has an entrance recess, which is disposed opposite the inside end of the rest projection in an arrangement angularly displaced to the key removal position of the cylinder core.

This solution provides a steering lock, the closing cylinder of which is insertable easily, and within a short time, in the steering lock already mounted in the automotive vehicle. Thus, the lock cylinder of a steering lock can be easily appointed jointly with the cylinder of the door grip, the trunk lock, etc. to the mounting position and there inserted jointly with the latter. Since the bolt of the steering lock is disposed prior to the insertion of the lock cylinder in a position withdrawn from the eccentric, the insertion of the lock cylinder, in case of inserted key and angularly displaced cylinder core, takes place, so that a coupling between the free end of the cylinder core and the driver opening of the eccentric can take place. Only in this angularly displaced position of the cylinder core, can the rest projection arresting the lock cylinder in the steering lock housing during inward sliding of the closing cylinder be pressed backwardly. In order that the intermediate member moved which is radially outwardly by the key during insertion of the closing cylinder is not engaged by the inside end on the end side of the steering lock of the locking member which is rigidly disposed in the steering lock in a deforming manner, an oblique engagement is coordinated to the intermediate member. The steering lock end sided end of the spring-biased locking member slides over the oblique engagement and realizes thereby a disturbace free insertion of the lock cylinder. The oblique engagement sitting on the one side wall of the locking member entrance channel of the lock cylinder extends merely over a part of the width of the entrance channel of the locking member. The partial width corresponds about the laterally extending projection of the locking member, which projection engages the oblique engagement only during the sliding-in of the closing cylinder. Upon completely inserting of the lock cylinder, the projection of the locking member then enters behind the oblique engagement, so that the locking member can swing in the remaining width between the oblique engagement and the other side wall of the locking member-entrance channel. The rest projection of the lock cylinder does not interfere in any manner with the disturbance-free insertion of the latter. A forced radial displacement of the rest projection takes place by means of a latchhead, the inside end of which yields into an entrance recess of the jacket face of the cylinder core. In the end insert position the latchhead of the resiliently engaging rest projection into a recess of the steering lock housing and secures the non displaceable position of the closing cylinder.

With these and other objects in view which will become apparent in the following detailed description, the present invention, which is shown by example only, will be clearly understood in connection with the accompanying drawings, in which:

FIG. 1 is a front elevation of the steering lock;

FIG. 2 is a side elevation of the steering lock shown in FIG. 1;

FIG. 3 is a longitudinal section of the steering lock shown in the holding position, indicated at an enlarged scale;

FIG. 4 is a section along the lines IV—IV of FIG. 3;

FIG. 5 is a section along the lines V—V of FIG. 3;

FIG. 6 is a section along the lines VI—VI of FIG. 3;

FIG. 7 is a section along the lines VII—VII of FIG. 5;

FIG. 8 is a fragmentary bottom plan view of the showing in FIG. 3 and in particular with the cover in section;

FIG. 9 is a longitudinal section through the lock during the insertion of the lock cylinder, and FIG. 10 is a section along the lines X—X of FIG. 9.

Referring now to the drawings, the steering lock housing 1 has a radially projecting housing section 1'. In the latter sits the lock cylinder 2. The radially projecting rib 3 extends into a groove 4 of the housing section 1' and secures the lock cylinder 2 against rotation in the steering lock housing 1.

The lock cylinder 2 supports the cylinder core 6 rotatable into the corresponding closing positions by means of the key 5, to which cylinder core 6 are coordinated tumblers 7 engaged by springs 8.

The rearward end of the cylinder core 6 has a flattened portion 9' and enters in a coupling arrangement in a corresponding driver opening 10 of an eccentric 12 mounted in a bore 11 of the steering lock housing 1. The eccentric 12 controls a bolt 15 engaged by a bolt spring 14 and is displaceable in a cross channel 13 of the steering lock housing 1.

The bolt 15 comprises a frame-like designed bolt-tail 16 and the bolt head 17 pivotally connected with the latter, which bolt head 17 enters in its locking position into a recess of the steering column.

A passage opening 18 for the shaft 19 secured in the eccentric 12 is provided on the bolt-tail 16. The shaft 19 projects through a bore 20 of the steering lock housing 1 and enters into the ignition switch 21, the switching roller of which (not shown in detail) is rotated in accordance with the locking positions of the cylinder core 6.

In a longitudinal groove 22 of the steering lock housing 1, there is mounted a double armed locking member 24 about an immovable pin 23. The double armed locking member 24 is engaged by a pressure spring 25, such, that the end 26 of the locking member 24 on the end face of the steering lock and side engages an intermediate member 27. The intermediate member 27 guides itself in a bore 28 of the closing cylinder 2 and controls a key slot-closing slide 31 yieldable behind the end plate 29 of the cylinder core in a recess 30 of the latter, radial to the cylinder core 6. The key slot-closing slide 31 has T-shape and is pointed with its 31' towards the intermediate member 27. The latter has T-shape and is pointing with its stay 31' towards the intermediate member 27. The pot edge 29' of the end plate 29 surrounding the forward end 6' of the cylinder core 6 has a passage opening 32 for the intermediate member 27 as well as for the stay 31' of the key slot-closing slide 31.

This design brings about, that the key slot-closing slide 31 is retained by the spring 25 in a position covering the key slot 33 and the intermediate member 27 is retained over the locking member 24.

In order to make possible a simplified insertion of the key 5 into the key slot 33, a funnel shaped key insert opening 34 is provided, which, on the one hand, is formed by the end sided inclination 35 of the cylinder core 6 and, on the other hand, by an inclined face 36 of the key slot-closing slide 31.

The end plate 27 has a projection 37 exact as to its contour to the end sided inclination 35.

The bolt sided end 38 of the locking member 24 has a locking pin 39, which cooperates with the catch 40 of the bolt-tail 16.

The angularly shaped latch 40 is disposed in a recess 41 of the arm 16' of the frame like bolt-tail and is swingably mounted about the pin 42. The shorter angular arm 43 is engaged by the bolt spring 14, while the other longer angular arm 43' forms a recess 44, on which is latch nose 46 follows by means of an obliquely rising control face 45. By means of a step 47 the latch nose 46 is transformed into the set-off section 48, which engages on the inside the arm 16' and thus forms the abutment for the swinging movement of the latch 40. In a locking position of the steering lock, in which the bolt is withdrawn, the rest tooth 39 of the locking member enters in front of the step 47 of the latch nose 46.

The locking member 24 extends with its end in the longitudinally disposed locking member-entering channel 49 of the closing cylinder 2. On the one side wall 49' of the locking member-entrance channel 49 there is a run-up incline 50 prearranged in front of the intermediate member 27, which incline 50 extends only over part of the width X of the locking member entrance channel 49. The width y between the run-up incline 50 and the other side wall 49'' corresponds to the width of the locking member, in order to make possible a swinging of the latter. Furthermore on the steering lock end sided end 26 of the locking member 24, a laterally projecting extension 51 is arranged, which extension 51 is disposed in case of an inserted lock cylinder 2 behind the run-up incline 50, whereby the swinging of the locking member 24 is not interferred with into the corresponding position, (see FIGS. 3 and 8).

The closing cylinder is equipped with a rest projection 52. The inside end 53 of the projection 52 engaged by a spring 52' and formed with a latch head 54 is disposed in a holding position of the steering lock, see in particular FIG. 5, in front of the jacket face F of the cylinder core 6. In the same plane has the jacket face F an entrance recess 55, which is arranged opposite to a key removal position of the cylinder core 6 in an angularly displaced arrangement to the inside end 53 of the rest projection 52.

The projection 52 is secured against rotation by a cross pin 56 which extends into a radial slot 57 of the lock cylinder 2. The latch head 54 enters in an inverted position of the lock cylinder 2 into a recess 58 coordinated thereto and arrests the lock cylinder 2 against axial displacement in the steering lock housing 1.

The insertion of the lock cylinder 2 into the steering lock housing 1 is apparent from FIGS. 9 and 10.

Prior to the insertion, the cylinder core 6 is rotated by means of the key 5 so far, that the inside end 53 of the rest projection 52 is flush with the entrance recess 55 of the cylinder core 6. In this angular position of the cylinder core 6 is disposed the rearward end 9 of the clyinder core 6 in corresponding position with the driver opening 10 of the eccentric 12, which retains the bolt 15 in withdrawn position.

During insertion of the lock cylinder 2 into the steering lock housing 1, the runup incline 50 of the locking member-entrance channel 49 engages the laterally extending projection 51 of the locking member 24, whereupon the latter is forced against the force of the spring 25 in arrow direction z, see FIGS. 9 and 10. The run-up incline 50 closes with the end face 27' of the intermediate member 27 moved radially outwardly by the key 5, so that the latter can enter disturbance-free in front of the end 26 of the locking member 24.

Simultaneously to this previously mentioned movement occurrence, the latchhead 54 engaging the step edge 59 of the steering lock housing 1 causes a forced displacement of the rest project 52, the inside end 53 of which yields into the entrance recess 55 of the cylinder core 6, in order to interengage upon reaching the end-insert position of the lock cylinder 2 in the recess 58.

Under circumstances, the recess 58 for the latchhead 54 can be flush with an opening 60 of the front sided steering lock housing covering cap 61, in order to make possible a dismounting of the lock cylinder 2. In this case, an auxiliary tool can be inserted through a bore 60, in order to press the rest projection 52 into the releasing position, this, however, though only in case of an angularly displaced cylinder core.

While I have disclosed one embodiment of the present invention, it is to be understood that this embodiment is given by example only and not in a limiting sense.

I claim:

1. A steering lock equipped with a lock cylinder in particular for automotive vehicles, comprising
   a steering column including a lock housing,
   a bolt means for locking of said steering column upon entering its locking position,
   spring means for causing said bolt means to enter said locking position,
   a locking member having ends mounted in said lock housing and resiliently engaging by one of its ends said bolt means in an unlocked position of the latter, for securing said bolt means against unintended locking of said steering column,
   a lock cylinder removably disposed in said lock housing,
   an intermediate member disposed in said lock cylinder,
   a lock key operating tumbler means,
   said locking member being controlled by said lock key via said intermediate member positioning the former into said engaging of said bolt means, and said locking member releasing said bolt means into said locking position of said bolt means after at least nearly complete removal of said lock key,
   a cylinder core mounted in said lock cylinder for receiving said lock key and rotatable into corresponding locking positions by means of said lock key,
   said lock cylinder having a catch sliding means for releasably locking said lock cylinder in said lock housing and capable of being pressed back into said lock cylinder out of engagement with said lock housing in a lock cylinder removal position only at a predetermined angularly displaced position of said cylinder core relative to said lock cylinder, and
   a run-up inclination on said lock cylinder for another end of said locking member to run thereon during insertion of said lock cylinder in said lock housing and said inclination coordinated to said intermediate member operatively positioning said locking member relative to said intermediate member for controlling said lock key.

2. The steering lock, as set forth in claim 1, wherein
   said lock cylinder has a longitudinally locking member entrance channel including a side wall, and
   said run-up inclination sits on said side wall of said locking member-entrance channel,
   said run-up inclination extends only over part of the width of said locking member-entrance channel, and
   said locking member has at said another end pointing towards said intermediate member a projection set off from said intermediate member.

3. The steering lock, as set forth in claim 1, wherein
   said catch sliding means is formed with a slope head for sliding over a radially inwardly pointing projection of said lock housing being pressed thereby radially inwardly during insertion of said lock cylinder into said lock housing,
   said catch sliding means includes an inside end disposed radially outwardly of a jacket face of said cylinder core, and
   said jacket face has an entrance recess for said catch sliding means, which is disposed opposite said inside end of said catch sliding means in a removed position of said lock key from said cylinder core, and
   said inside end of said catch sliding means being capable of being radially inwardly pressed into said entrance recess in said lock cylinder removal position out of retaining engagement with said lock housing.

* * * * *